United States Patent [19]
Nametz et al.

[11] 3,965,214
[45] June 22, 1976

[54] FLAME RETARDANT ABS POLYMER COMPOSITIONS

[75] Inventors: Richard C. Nametz, St. Louis; Robert J. Nulph, Alma, both of Mich.

[73] Assignee: Michigan Chemical Corporation, Chicago, Ill.

[22] Filed: Dec. 18, 1972

[21] Appl. No.: 315,953

Related U.S. Application Data

[63] Continuation of Ser. No. 209,411, Dec. 17, 1971, abandoned.

[52] U.S. Cl. .............. 260/880 R; 260/45.7 R; 260/45.75 B; 260/893
[51] Int. Cl.² .............. C08K 3/22; C08K 5/03; C08L 55/02
[58] Field of Search ............. 260/45.7 R, 45.75 B, 260/880 R

[56] References Cited
UNITED STATES PATENTS

| | | | |
|---|---|---|---|
| 2,028,715 | 1/1936 | Hanson | 252/8.1 |
| 3,133,038 | 5/1964 | Hahn | 260/41 |
| 3,333,970 | 8/1967 | Green | 106/15 |
| 3,347,822 | 10/1967 | Jenkner | 260/45.75 |
| 3,403,036 | 9/1968 | Hindersinn et al. | 260/45.75 |
| 3,442,980 | 5/1969 | Grabowski | 260/880 |
| 3,455,873 | 7/1969 | Jenkner | 260/45.7 |
| 3,624,024 | 11/1971 | Caldwell et al. | 260/40 |
| 3,666,617 | 5/1972 | Marciniak | 161/186 |
| 3,686,362 | 8/1972 | Hinckley et al. | 260/876 |
| 3,691,262 | 9/1972 | Hagerman | 260/890 |
| 3,699,077 | 10/1972 | Murray | 260/45.9 |
| 3,741,893 | 6/1973 | Mascioli et al. | 252/8.1 |
| 3,751,396 | 8/1973 | Gall | 260/40 |
| 3,830,766 | 8/1974 | Praetzel et al. | 260/28.5 |
| 3,852,393 | 12/1974 | Furukawa et al. | 260/873 |
| 3,855,356 | 12/1974 | Luce | 260/881 |

*Primary Examiner*—Lewis T. Jacobs
*Assistant Examiner*—R. A. White
*Attorney, Agent, or Firm*—Robert M. Phipps

[57] ABSTRACT

Acrylonitrile-butadiene-styrene polymer compositions are rendered flame retardant by the incorporation therein of an effective amount of decabromobiphenyl. The flame retardant composition has the added advantage of being stable against discoloration caused by light and/or ultraviolet radiation.

5 Claims, No Drawings

FLAME RETARDANT ABS POLYMER COMPOSITIONS

This is a continuation, of application Ser. No. 209,411, filed Dec. 17, 1971, now abandoned.

The present invention relates to flame retardant acrylonitrile-butadiene-styrene polymers. More particularly, it relates to utilizing decabromobiphenyl as a suitable flame retarding agent which is also resistant to visible and ultraviolet radiation.

Acrylonitrile-butadiene-styrene compositions commonly referred to as ABS, are polymers produced generally by a blending or grafting methods. The former refers to a mechanical blend, followed by melt mixing of styrene-acrylonitrile copolymer and butadiene-acrylonitrile rubber; whereas the latter method involves grafting styrene and acrylonitrile monomers onto a network of polybutadiene and melt mixing with a styrene-acrylonitrile copolymer. The graft method has been considered superior to the other one and is generally followed. It can be seen that the ability to control the extent of the grafted portions and/or excess polybutadiene would allow the formation of polymers having various desirable properties. For example, in addition to their two outstanding properties of excellent toughness and high mechanical strength ABS plastics can be made with improved resistance to environmental effects, heat distortion and abrasion. Of course, the inherent thermoplastic characteristics of ABS compositions have allowed them to be molded, extruded, calendered or machined to produce a number of industrial and consumer products. Of note are luggage, seating materials, pipes, housings for appliances, packagings and many others.

ABS plastics are generally considered to have an excellent future potential for growth. Since their introduction in 1947 the rate of growth of ABS plastics has been well above average, particularly in the last decade. However, there appears to be one important factor which may deter this expected growth, i.e., flammability. Public and official concern over the potential danger of flammable consumer products has materialized recently in the form of legislative acts requiring some products to have certain levels of flame retardancy. In fact, it is anticipated that future requirements and standards for flammable materials will be more stringent than those applicable at present.

ABS plastics and polymer compositions tend to be slow burning materials. In the past, it was thought that sufficient flame retardancy would be provided by applying intumescent coatings to the finished product. This, however, has not been adequate for many applications and it has become clear that other approaches were indicated to render ABS compositions flame retardant.

Early attempts to reduce the flammability of ABS plastics centered on the random addition of known flame retarding agent to the virgin plastic. Little success was obtained by this approach which gave rise to many difficulties. For example, many flame retarding additives could not withstand the high temperatures and pressures which ABS polymers undergo during blending, processing and fabricating operations. Thus, the finished product was often discolored due to the decomposition or break-down of the flame retarding agent. Even those agents which proved stable under the above conditions failed in other respects, such as lacking compatibility, being migratory or providing insufficient flame retardancy. For the purpose of this invention, compatibility refers to the ability of the additive agent to blend with and be incorporated within the substrate of the polymer with little adverse effects on the polymer's physical properties. As to migration, it relates to the tendency of the additive to exude oil or sweat out of the polymeric system. It can be seen that, in time, a migratory flame retarding agent would be of little or no use.

Other approaches to reduce flammability were considered, but without much success. For example, attempts were made to provide flame retardancy to ABS plastics by introducing the flame retardant additive during the polymerization reaction. This proved to be undesirable because the reaction appeared to be sensitive to the presence of unrelated components either causing premature polymerization, or seriously interfering with it.

In the prior art, certain halogen-containing compounds were recommended for flame retarding ABS plastics including highly chlorinated non-volatile adducts of cyclopentadiene as disclosed in U.S. Pat. No. 3,418,263. In fact, a number of halogenated alicyclic compounds have been suggested for flame retarding thermoplastic polymers, including ABS. See in this connection, U.S. Pat. Nos. 3,403,036 and 3,420,786. Compounds containing phosphorus and halogen atoms have also been incorporated in ABS polymers as disclosed in U.S. Pat. Nos. 3,322,716, 3,422,048 and 3,431,324.

The flame retarding agents mentioned above have found limited use in ABS plastics because at accepted levels of addition they proved ineffective. Furthermore, these halogenated alicyclic compounds and their adducts are expensive and often require the addition of synergists making the process uneconomic for most applications. Because bromine-containing compounds have been regarded as better flame retardants, several brominated additives have been recommended for ABS plastics. Experience has shown that while good flame retardancy could be attained at reasonable cost, most brominated additives, especially the aromatic type, were sensitive to light. This sensitivity to light which is believed to result from the break-down of the additive shows as dark spottings in a medium of discoloration. Attempts to include light stabilizers and antioxidants have not been successful. It appears that ultraviolet radiation is the most harmful. In fact it can be shown that ultraviolet light possesses sufficient energy to rupture the aromatic carbon-bromine bond.

The primary object of the present invention, therefore, is to provide a flame retarding agent which when added to ABS polymers will yield flame retardant and light stable compositions.

Another object of the invention is to provide a flame retarding agent which is both compatible and economic for use with ABS polymers.

A further object is to provide a flame retarding agent which can withstand all blending and processing steps encountered in the manufacture and fabrication of ABS plastics.

To attain the objects of this invention it has been discovered that flame retardant and light stable ABS polymer compositions can be prepared by incorporating therein an effective amount of decabromobiphenyl. The flame retardant compositions are particularly suitable for out-door uses and wherever exposure to ultraviolet light is expected, such as in electronic equipment.

Decabromobiphenyl can be prepared by various methods. One such method of preparation brominates biphenyl in an oleum medium at temperatures approaching 200°C. Another method utilizes liquid bromine as a reactant-solvent to effect the complete bromination of biphenyl, see co-pending patent application Ser. No. 80,122, now abandoned, assigned to the same assignee as the present application. Both methods utilize a bromine-transfer catalyst such as aluminum or iron halides. The finished product is generally off white in color and is about 84.6% bromine by weight. It is rather high melting having a melting point of 385°–87°C. It is normally incorporated in the particular polymer system at some convenient stage. In the case of ABS plastics, decabromobiphenyl is incorporated in the virgin material prior to fabrication or is blended therewith during the process of forming the polymer. As prepared, the decabromobiphenyl is normally a fine powdery material and can be incorporated as such. In some applications there may exist a particularly stringent requirement as to the physical properties of the finished product. In this case, micronized or finely-divided decabromobiphenyl may be preferred. It has been found that a product having a particle size of about 2 – 8 microns would show little to no adverse effects on the flexural strength of the ABS polymer. A product passing a 200 mesh screen (U.S. Sieve Series No. 200) would be satisfactory for most applications, however.

In general, synergists are added to enhance the flame retardancy of most halogenated flame retarding additives. Decabromobiphenyl behaves in a similar manner. Thus any synergist selected from antimony, bismuth or arsenic-containing compounds and others such as zinc borate would operate to enhance the flame retardant properties of ABS polymeric compositions when added in combination with decabromobiphenyl. Because of their availability and reasonable cost, antimony-containing compounds are preferable, particularly antimony trioxide.

In the past the study and production of flame retardant systems were handicapped considerably by the lack of specific standards and/or test procedures. For example, what one test calls "self-extinguishing" another may call it "flame retardant". The reason for the apparent discrepancy is believed to be due to the empirical basis of many flammability tests. Nevertheless, such tests are desirable as they provide practical means of comparison. In this connection, it would be quite relevant to define the terms by which flame retardancy was measured or defined thereby enabling better understanding of the results.

The flame retardancy of ABS plastics containing decabromobiphenyl was determined by three separate flammability tests which were the "Oxygen Index", Underwriters' Laboratories, Inc. Subject 94 and the one described under Federal Specification CCC-T-191, Method 5902. The Oxygen Index, abbreviated as (O.I.) and designed by the American Society for Testing and Materials as D 2863-70, is defined as the minimum volume fraction of oxygen in an atmosphere of oxygen and nitrogen, which is needed to just sustain or provide a state of steady burning of a polymeric specimen. Since air contains about 20.9% oxygen, a material which burns in air, as defined, would have an O.I. of about 20.9%. Thus an O.I. value has the unique property of correlating the flammability of a plastic specimen to the available oxygen in its immediate environment. Most plastic materials have O.I. values below 21%. For untreated ABS it is generally around 18.

As to Underwriters' Laboratories, Inc. Subject 94, known as UL94 (See Modern Plastics, October 1970, page 92) it refers to the burning rate of a particular plastic material in what is known as the Vertical Bar Test. This involves supporting the test specimen from its upper and, with longest dimension being vertical, by a clamp in such a manner that the lower end is three-eighth inch above the top of the burner tube which provides a blue flame of three-fourth inch in height. The flame is allowed to remain 10 seconds under the specimen and is then withdrawn, and the duration of the flaming or glowing combustion of the specimen noted. In flaming or glowing combustion of the specimen ceases within 30 seconds after removal of the test flame, the process is repeated. The results are classified as follows:

SE 0: Extinguishment is in 5 seconds or less, no flaming dripping and a maximum of 10 seconds of afterglowing.

SE 1: Extinguishment is in 25 seconds; no single value of burning plus glowing time is greater than 30 seconds and no flame dripping.

SE 2: Same as SE 1 except that flaming dripping occurs.

SB: Slow burning; burning as a rate of less than 1.5 in/minute.

With respect to Method 5902 it is similar to UL94 in that it involves a vertical flame whereby a thin panel (about 50 mil) is contacted for 12 seconds with a ¾ inch standard flame. Extinguishing time in seconds is measured and under five is considered desirable.

The following examples exemplify the method of producing flame retardant ABS polymeric compositions. It is to be understood that these examples are provided as illustration of the invention and not as limitations therefor. All parts and percentages mentioned herein are by weight unless specified otherwise.

EXAMPLE I

A virgin ABS plastic polymer material believed to be free of additives (Naugatuck No. 3168, a product by Uniroyal Chemical, Spencer Street, Naugatuck, Conn.) was utilized as the base resin. A 40.0 gram sample of the plastic was placed in a Braebender mixer ("Plasti-Corder", Torque Rheometer, Model PLV-150, C. W. Braebender Instruments Inc., South Hackensack, N.J.). This mixer has a pair of sigma shaped blades contained in a heatable head. The plastic was heated to about 245°C. at which temperature it was in the molten state. 8.50 grams of decabromobiphenyl and 1.5g of $Sb_2O_3$ were added to the molten plastic and allowed to blend therewith. The mass was rotated at 50 to 60 rpm with a torque of about 5000 meter-grams. After blending was completed (5 minutes) the molten plastic was poured into a mold for pressing into panels having a smooth surface with the following planar dimensions 3 × 2 inch but with two thicknesses, i.e., ⅛ inch and 1/16 inch. The ⅛ inch thick panels are suitable for light stability measurements. For flammability tests, however, the dimensions are different as they are smaller in width than the above. For the O.I. and UL94 tests the dimensions are 3 × ½ × 1/16 inch wereas for Method 5902 the thickness is reduced to 0.05 inch.

The flammability data obtained on the panels having the above described composition, i.e., 17.0% decabromobiphenyl, 3.0% antimony trioxide and the remainder ABS plastic are as follows: Oxygen Index: 29%, Method 5902: 0 sec., and UL94: rating of 1.

Other compositions containing various levels of decabromobiphenyl and $Sb_2O_3$ were formulated and tested as to flammability. Listed in Table 1 are the results of several compositions formulated in accordance with the procedure described under Example I. For comparison purposes data for an ABS panel containing no flame retardant additives are also provided.

Table 1

| % Decabromo-biphenyl | % Antimony Trioxide | O.I.,% | UL94-Rating | Method 5902, seconds |
|---|---|---|---|---|
| 0 | 0 | 17.5 | None | >5 |
| 14 | 1 | 24.3 | 1 | <5 |
| 17 | 1 | 25.5 | 1 | <5 |
| 20 | 1 | 27.0 | 1 | 0 |
| 14 | 3 | 26.5 | 1 | <5 |
| 14.6 | 3 | 27.8 | 1 | 0 |
| 17 | 3 | 29.0 | 1 | 0 |
| 20 | 3 | 33.8 | 0 | 0 |

Light stability of flame retardant ABS panels is generally related to the stability of the flame retarding additive agent. In addition to visual observation, light stability may be determined by reflectance measurements at a pre-determined wavelength. This method may be somewhat empirical but it served as a good means for distinguishing visually close colors. The method relies by and large on the theory that dark color panels tend to absorb more visible and near-visible radiation than ones having light colors. Of course, it is assumed that both the dark and light panels have comparable surface conditions. Because of ease of measurement the reflected portion of an incident light beam of known intensity was measured. A blank ABS panel is white in color. Compared to a magnesium carbonate standard at 425 millimicrons the blank panel reflects about 90–91% of an incident light beam. The wavelength 425 millimicrons was determined empirically to be an optimum wavelength.

ABS panels containing various flame retarding agents as well as decabromobiphenyl were placed in a "Weather-Ometer" (a trademark of Atlas Electric Devices Company, Chicago, Ill. 60613 ) for accelerated exposure to visible and ultraviolet radiation. Briefly, the Weather-Ometer comprises a metal chamber equipped, among other things, with various controlled sources of light, temperature and humidity designed to simulate some desirable state or condition. Light sources may be, for example, xenon arc, carbon arc or violet carbon arc lamps. For the tests conducted on the light stability of flame retardant ABS panels a Weather-Ometer Model 25/18-WR equipped with 2500 Watt xenon arc lamp was used. Exposure times were held long enough to provide some indication of the stability of the flame retarding agent. These exposure periods often lasted 200 hours.

A particularly quick method of testing additives' stability to ultraviolet radiation was effected by placing the panels under study in a small and secured box equipped with two ultraviolet lamps (15 Watt germicidal tubes). This means of providing exposure to ultraviolet radiation was very rapid such that one hour exposure compared to one hundred hours in the Weather-Ometer.

The exposed panels, on a visual basis, showed the rapid deterioration of most known flame retarding agents. Decidedly, decabromobiphenyl was shown to be resistant to visible light and ultraviolet radiation and, in effect, superior to other agents including the various "Aroclors" (a trademark of Monsanto Chemical Company, St. Louis, Mo., for chlorinated biphenyls and polyphenyls), tribromoanisole, tetrabromophthalic anhydride, hydroxy tetrabromophthalamide, tribromophenol, pentabromophenol, pentabromophenylallyl ether and crude brominated biphenyls.

On a comparative basis, reflectance results based on the test explained hereinbefore showed that panels flame retarded with decabromobiphenyl reflected about 80% of the incident light beam whereas the other additives tested showed reflectance of about 60–70%. On a visual basis panels showing dark or brown coloration of unacceptable quality gave reflectance measurements of about 63–67%; those about 78% and higher were considered acceptable.

Addition of known U.V. absorbers and antioxidents to the various flame retarding agents tested, except for decabromobiphenyl, showed little to no improvement, in light stability. Thus, use of decabromobiphenyl, with or without known synergists, for flame retarding ABS plastics is of considerable significance.

What is claimed is:
1. A flame retardant thermoplastic composition comprising an acrylonitrile-butadiene-styrene polymer having incorporated therein a flame retarding mixture consisting of 5 to 25 percent by weight of decabromobiphenyl and 1 to 5 percent by weight of antimony trioxide, all percentages being based on the total weight of said composition.

2. A flame retardant material according to claim 1 wherein the decarbromobiphenyl is in the range of 7 to 20 percent by weight.

3. A flame retardant material according to claim 1 wherein the antimony trioxide is added in the range of 1 to 3 percent by weight.

4. A flame retardant material according to claim 1 wherein the decabromobiphenyl is in the range of 7 to 20 percent by weight and the antimony trioxide is in the range of 1 to 3 percent by weight.

5. A flame retardant material according to claim 1 wherein said decabromobiphenyl present in said polymer has a particle size from about 2 to about 8 microns.

* * * * *